United States Patent

Lee

[11] 3,965,607
[45] June 29, 1976

[54] ANIMAL TRAP

[76] Inventor: Donald R. Lee, Box 577, Sundance, Wyo. 82729

[22] Filed: Mar. 18, 1975

[21] Appl. No.: 559,549

[52] U.S. Cl. .................................................. 43/87
[51] Int. Cl.² ...................................... A01M 23/34
[58] Field of Search ....................................... 43/87

[56] References Cited
UNITED STATES PATENTS

| | | | |
|---|---|---|---|
| 83,220 | 10/1868 | Stone et al. | 43/87 |
| 2,095,145 | 10/1937 | Masters | 43/87 X |
| 2,110,389 | 3/1938 | Bailey | 43/87 |

Primary Examiner—Louis G. Mancene
Assistant Examiner—Daniel J. Leach
Attorney, Agent, or Firm—Whittemore, Hulbert & Belknap

[57] ABSTRACT

An animal trap comprising a plurality of radially extending arms pivoted at their inner ends to a ring, and a noose extending through guides at the outer ends of said arms. Resilient means controls an actuating mechanism for reducing the circumference of the noose, which thereby swings said arms upwardly to guide the noose in closing movement over the muzzle of an animal caught by the trap.

15 Claims, 5 Drawing Figures

ANIMAL TRAP

BRIEF SUMMARY OF THE INVENTION

The present invention relates to an animal trap which comprises essentially a fixed anchor tube adapted to be driven into the ground to prevent escape of an animal caught by the trap.

A trigger is provided adjacent the top of the tube and is movable upwardly when gripped in the jaws of an animal for which the trap is intended to release the trap mechanism.

A plurality of arms extending radially outwardly from the trigger are pivoted at their inner ends, and at their outer ends support and guide a flexible noose. Means are provided, when the trigger is tripped by an animal, for reducing the circumference of the noose, which has the effect of causing the arms to swing upwardly in unison, holding the noose open as it moves over the muzzle of the animal which has actuated the trigger.

In the preferred form of the invention, a strong compression spring is provided in the lower part of said fixed tube, and a movable tube rests on the top of the spring and is movable vertically in the fixed tube. In set condition, the top of the movable tube is adjacent the upper end of the fixed tube.

At least two of the pivoted arms have a pair of spaced noose guides at their outer ends. A pair of flexible cables or cable have their lower ends fixed adjacent the bottom of the fixed tube and extend upwardly through the vertically movable tube and thence to points of connection with the noose between the individual pair of guides. The pivoted arms are pivoted to the upper end of the vertically movable tube.

The trigger mechanism comprises a trigger pivoted to the fixed tube and having an abutment which in set position overlies an upwardly facing abutment surface on the movable tube. It also includes a vertically movable cap adapted to be taken in the jaws of an animal and lifted to actuate the trap. In its set position, the cap retains the trigger in position to block upward movement of the movable tube.

When the cap is lifted by the animal, it releases the trigger, which permits the spring to move the movable tube upwardly rapidly and with considerable force. If the animal attempts to raise his head away from the trap, movement of the tube causes its upper end to follow the animal and ensures closure of the noose over his muzzle.

Upward movement of the movable tube carries the pivoted arms upwardly and causes a rapid closure of the noose. Since the cables are drawing doubled portions of the noose from between the guides of each of two pairs of guides, the circumference of the noose is reduced by four times the distance of upward movement of the tube.

Some or all at the arms of their outer ends may be provided with barbs or pointed projections to engage the muzzle of the animal to prevent withdrawal. If desired, an air-impervious flexible sheet may overlie the entire trap in set position, and will be projected upwardly and closed about the muzzle of the animal, to quickly smother it.

While the specific disclosure is of a trap dimensioned to engage the muzzle of an animal lifting a bait cap, it will of course be obvious that a larger trap would draw the noose tightly about the neck of an animal lifting the cap. Also, the trap could be actuated by a depressible trigger, and operate to close the noose about the leg of an animal.

DETAILED DESCRIPTION

Figure 2:
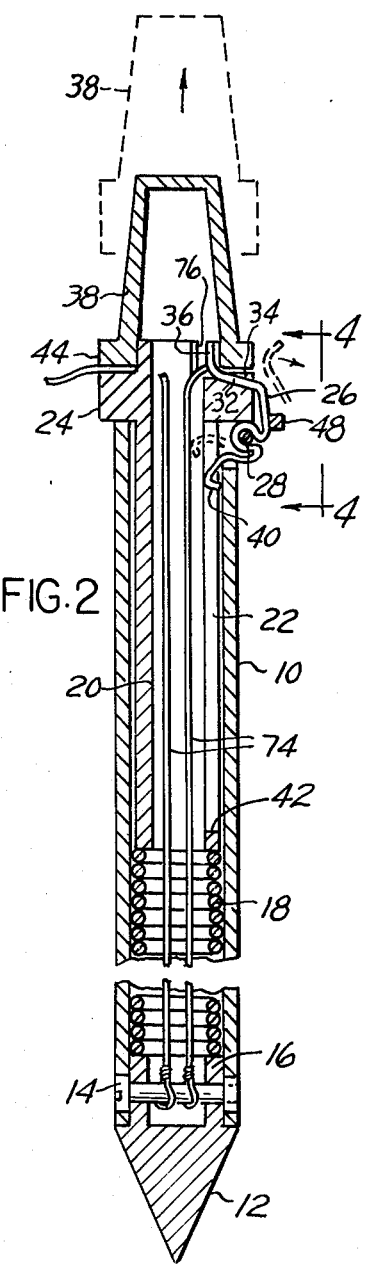
FIG. 2 is a fragmentary vertical section through the trap.

Referring now to the drawings, the trap comprises an open-topped tube 10 having a driving point 12 secured to its lower end by means of a recessed nut and bolt device 14 which secures the driving point to tube 10 by extending through openings in an upwardly extending reduced annular flange 16 as shown in FIG. 2. It will of course be understood that in driving this tube into the ground, a suitable driving attachment may be provided at the upper end which prevents damage or distortion to the upper end of the tube 10.

The length of the tube is such that it provides a secure anchor for the trap and prevents it being carried away by an animal caught in the trap. It is also of length sufficient to form a housing to provide a spring action throughout a predetermined length as will subsequently appear.

Located in the lower portion of the tube 10 and abutting against a spring seat constituted by the upper end of the annular flange 16 is a compression spring 18 which is illustrated in FIG. 2 as in its fully compressed condition. Engaged on the top of the spring 18 is a movable tube 20 provided at one side with an elongated slot 22 which terminates adjacent the upper end of the tube 20 beneath a radially extending support flange 24 and extending downwardly to a point adjacent but spaced slightly above the lower end of the tube.

In FIG. 2 the parts are shown in the set condition in which the vertically movable tube 20 is in its lowermost position determined by engagement between the flange 24 thereof with the upper end of the tube 10. As above noted, this corresponds with fully, or substantially fully, compressed condition of the spring 18.

Figure 1:
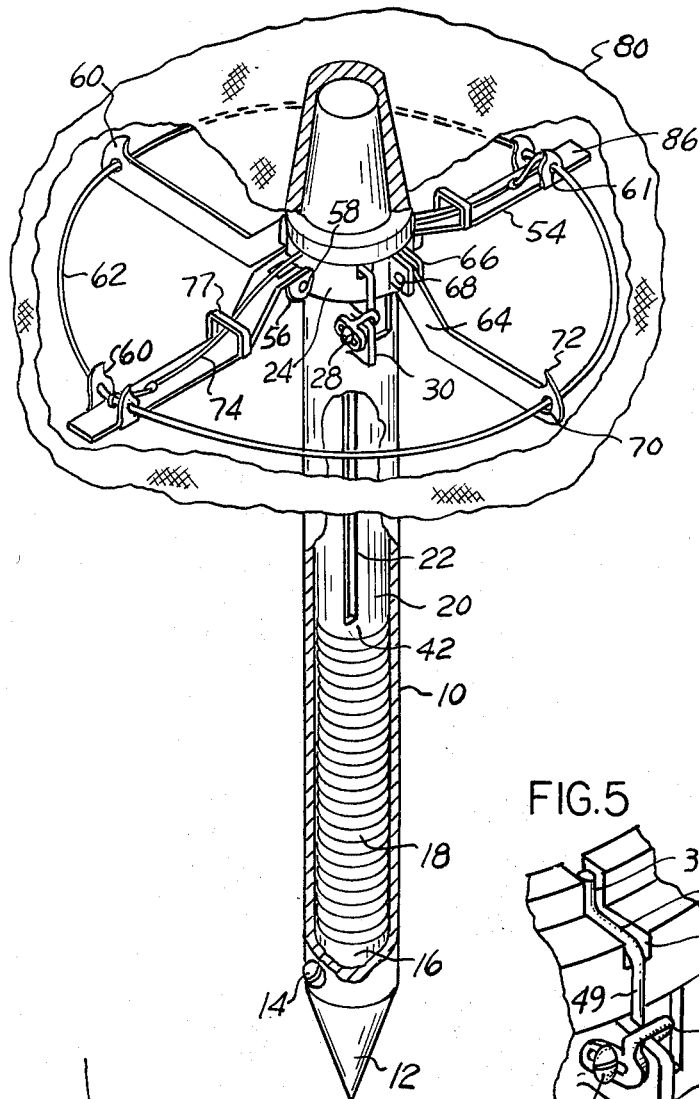
FIG. 1 is a perspective view of the trap in set position.

In order to retain the vertically movable tube 20 in the set condition illustrated in FIGS. 1 and 2, trigger mechanism is provided. Essentially, this trigger mechanism comprises a trigger 26 formed of spring wire which is pivoted by a pivot pin 28 carried by an ear 30 which is cut out from the top of the tube 10 and bent to extend generally radially therefrom. The trigger includes a portion 32 adapted to be received in a slot 34 at the bottom of a notch provided in the flange 24 as shown in FIG. 2. Extending upwardly from the portion 32 is a retainer portion 36 which is engaged by the inner surface of a trigger cap 38. Below the pivot pin 28 the trigger includes a portion 40 which extends into the slot 22 and prevents relative rotation between the fixed tube 10 and the movable tube 20. The elongated slot 22 permits upward movement of the movable tube 20 but such upward movement is limited by engagement of the portion of the tube indicated at 42 below the bottom end of the slot 22 with trigger 26. This prevents the tube 20 from being completely expelled from the fixed tube 10.

The cap 38 is designed to be taken by the animal in its jaws and then be drawn upwardly to release the trap for operation. Cap 38 may be made of metal, or tough plastic such as nylon. In use, the trapper would normally wind wool, flannel, or similar material around it from the radially extending flange 44 over the top of the cap, after which the covered cap would be dipped in melted paraffin and when the trap is set, it could be baited with a coating of a paste-type scent designed to lure the animal in and entice him to bite down on the cap and pull up on it in his desire to eat the scent off or to carry the cap away with him. It will be apparent that limited upward movement of the cap 38 disengages the retainer portion 36 of the trigger, at which time the trigger will be quickly projected to the dotted line position illustrated, releasing the movable tube 20 for abrupt movement upwardly until the stop portion 42 thereof engages the portion 40 of the trigger.

Figure 5:
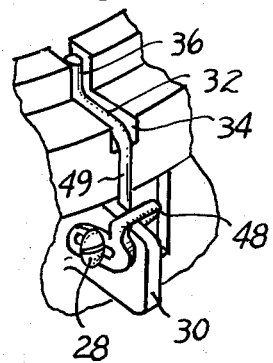
FIG. 5 is a fragmentary elevational view of a trigger latch.
Figure 4:
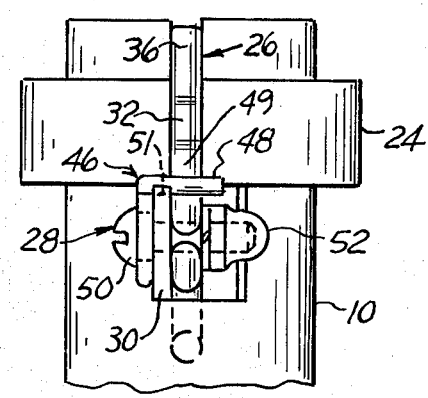
FIG. 4 is an enlarged elevational view of the trigger mechanism with keeper.

FIG. 4 is an enlarged elevation and FIG. 5 is a perspective view of the trigger mechanism, showing the detailed construction of keeper mechanism which is used to hold the trap in set condition prior to placement of cap 30 onto tube 20. In these Figures the trigger 26 is illustrated as being retained temporarily in the set position by a keeper 46 which receives the pivot support pin means 28 in an elongated slot and which has retainer arm 48 adapted to enter slot 51 in ear 30 and to engage the outer portion of the trigger 26 at portion 49 thereof. This holds the retainer portion 36 in position prior to placement of the trigger cap 38 thereover. After the trigger cap 38 has been positioned as illustrated in FIG. 2, the keeper 46 is pivoted out of engagement with the trigger to permit the trigger to function as intended upon removal of the trigger cap 38. In this Figure the pivot pin means is illustrated as comprising a screw 50 and nut 52 but any suitable means may be provided such for example as a rivet.

Figure 3:
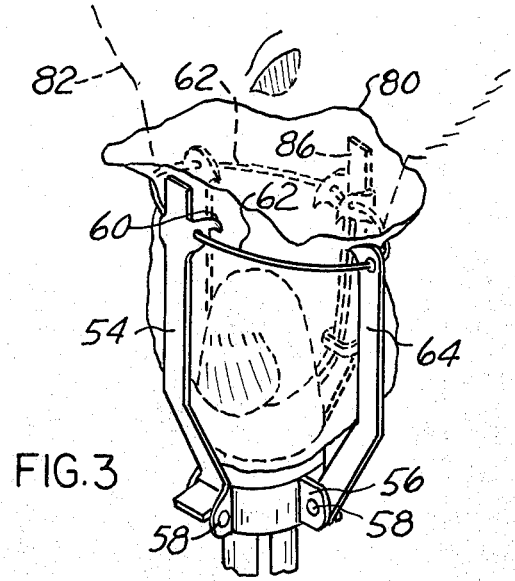
FIG. 3 is a fragmentary perspective view of the trap in sprung condition.

Referring now particularly to FIGS. 1 and 3, the trap comprises a pair of special guide arms 54 preferably located in diametrically opposed relationship, and pivoted to ears (not shown) extending radially outwardly from the support flange 24. Arms 54 include at their inner ends downwardly extending ears 56 apertured to receive pivot pins 58 as illustrated. Adjacent their outer ends the arms 54 are provided with a pair of upwardly extending pointed ears 60. As illustrated in FIG. 1 the ears 60 may conveniently be formed of material integral with the arms originally extending laterally therefrom and bent upwardly as illustrated in the Figure. The ends of the ears 60 are shaped as sharp pointed barbs to engage the muzzle of the animal actuating the trap and to prevent escape thereof. Arms 60 are provided with aligned guide openings 61 receiving a noose 62 formed of flexible material. Additional arms 64 are provided and as illustrated in FIG. 1, a pair of such arms are located in diametrically opposite relation intermediate the arms 54. At their inner ends the arms 64 are pivoted to ears 66 provided on the support flange 24 by pivot means indicated at 68.

At their outer ends, the arms 64 are provided with guide openings 70 through which the noose 62 passes, and are preferably further provided with sharp pointed barbs 72 engageable with the muzzle of the trapped animal.

The inner ends of the arms 54 and 64 are shaped such that they are retained against downward swinging movement from the position illustrated in FIG. 1, while free upward swinging movement thereof is readily permitted.

Means are provided for quickly and forcibly reducing the circumference of the noose 62 and this means comprises a pair of cables 74 which are anchored at their lower ends to the bolt and nut connector 14 which secures the driving point 12 to the tube 10. The cables 74 lead upwardly through the movable tube 20 where they separate and extend through guide notches provided at opposite sides of the movable tube 20. One of these notches is illustrated at 76 in FIG. 2 and one of the cables 74 passes through each of the notches 76 and thence along the length of the arms 54 through guide loops 77 where the upper or outer ends of the cable are secured to portions of the noose 62 intermediate the spaced guide means provided by the pair of ears 60 on each of the arms 54.

Arms 54 and 64 are positioned in set condition so that the plane occupied by the guide openings 61 and 70 is slightly above the plane occupied by the pins 58 and 68, so that upon forcible reduction in circumference of the noose, the arms 54 and 64 are swung upwardly in unison, retaining the noose in open substantially horizontal condition as its circumference is reduced so that it tightly engages around the muzzle of the trapped animal.

The reduction in circumference of the noose 62 upon forcible upward movement of the movable tube 20 is caused by the upper portion of each cable 74 drawing a doubled portion of the noose from between the spaced guide openings 61 in the arms 54. Since the portion of the noose drawn from between the spaced guide openings 61 is doubled, it will be apparent that reduction in the circumference of the noose is equal to four times the upward movement of the movable tube 20, while the lower ends of the cables 74 are retained in fixed position.

The trap includes a continuous flexible air-impervious sheet 80 which is draped over the set trap and of course is suitably concealed when the trap is set. The sheet 80 is placed in position before the trigger cap 38 is applied so that while the sheet 80 is continuous across its entire area, the cap 38 is exposed as a lure for the animal to be trapped.

In FIG. 1 the sheet 80 is largely broken away to illustrate the operating mechanism, but in FIG. 3 it is shown in the position which it will occupy when it is closed by the arms 54 and 64 upon the muzzle of the trapped animal, which in this Figure is indicated in dotted lines at 82.

The noose 62 and the cables 74 may be formed of steel wire material used as fishing leaders or other equivalent material. The connection between the upper ends of the cables 74 and the portions of the noose 62 intermediate the ears 60 may be by detachable fasteners such as used in fishing leaders.

It will be observed that the arms 54 include extensions 86 beyond the ears 60 and these are provided for the purpose of freeing the trapped animal by grasping these extensions and pulling them outwardly and downwardly.

Preferably, the sheet 80 is provided with a top surface permanently impregnated with sand or a similar material designed to retain a thin layer of dirt to prevent it being blown off.

An important advantage of the present trap is that it is practically impossible for an animal tripping the mechanism to escape. In traps which depend upon depressing a trigger as by a paw of the animal, the initial yielding of the trigger gives a very brief warning to the animal and in some cases it is possible that the animal may withdraw its paw before closure of the jaws of a conventional trap. With the present mechanism, if the animal senses that trap mechanism has been actuated he will immediately tend to raise his head but the upward abrupt and forcible movement of the movable tube, together with the pivoted arms and noose, cause the trap mechanism to follow the movement of the head on the animal and to insure closure of the noose about its muzzle.

While the specific embodiment illustrated contemplates that the trap will close the noose about the muzzle of the trapped animal, it will of course be apparent that a larger noose and longer pivoted arms might be designed such that the noose could be projected upwardly and close around the neck of the trapped animal. Also, while the illustrated embodiment is preferred, it will of course be apparent that the upwardly projected noose might be associated with a depressible trigger mechanism actuated by the paw of an animal, so that the noose and the barbed ends of the arms might close in gripping and retaining relation around the leg of the animal.

The anti-swivel structure provided by engagement of the trigger 26 in the slot 22 of the movable tube prevents the trapped animal from pivoting around and twisting the cables.

What I claim as my invention is:
1. An animal trap comprising
   a trigger mechanism adapted to be operated by an animal,
   a noose of flexible material surrounding said trigger mechanism, and
   actuating mechanism connected to said noose and controlled by said trigger mechanism operable to project said noose generally perpendicular to the plane in which it is set, to maintain said noose in open condition as it is projected, and to reduce the circumference of said noose to cause it to close in tightly about the part of the animal which operates said trigger mechanism, said trigger mechanism comprising a movable element shaped to be gripped between the jaws of the animal so that said noose closes around a head portion of the animal.
2. A trap as defined in claim 1 in which said movable element is operated to activate said noose only by lifting movement thereof.
3. An animal trap comprising
   a trigger mechanism adapted to be operated by an animal,
   a noose of flexible material surrounding said trigger mechanism, and
   actuating mechanism connected to said noose and controlled by said trigger mechanism operable to project said noose generally perpendicular to the plane in which it is set, to maintain said noose in open condition as it is projected, and to reduce the circumference of said noose to cause it to close in tightly about the part of the animal which operates said trigger mechanism,
   said actuating mechanism comprising a plurality of generally radially outwardly extending pivoted arms engaging said noose adjacent their outer ends,
   said actuating mechanism further comprising a pair of closely spaced guide means on one of said arms through which a portion of said noose extends, resilient means connected to the portion of said noose between said guide means and operable when released to draw a doubled portion of the noose through the guide means to reduce the circumference of the remainder of said noose.
4. A trap as defined in claim 3, at least some of said arms having adjacent their free ends pointed projections engageable with the head portion of the animal to prevent displacement of the noose after it has closed around the head portion of the animal.
5. A trap as defined in claim 3 comprising generally annular support means to which the radially inner ends of said arms are pivoted to provide for upward and inward swinging movement of the outer ends of said arms as said noose closes.
6. A trap as defined in claim 3 in which the reduction in circumference of the portion of said noose engaging the outer ends of said arms causes the upward and inward swinging thereof to guide the noose as it is closed in upon the head portion of the animal.
7. A trap as defined in claim 3 in which two pairs of spaced guide means are provided, and said resilient means is connected to both portions of said noose intermediate the guide means of each pair so as to draw the flexible material of said noose from between both pairs of guide means whereby movement of the connection between said resilient means and the portions of said noose for a given distance will reduce the circumference of the remainder of the noose by quadruple the given distance.
8. An animal trap comprising
   a trigger mechanism adapted to be operated by an animal,
   a noose of flexible material surrounding said trigger mechanism, and
   actuating mechanism connected to said noose and controlled by said trigger mechanism operable to project said noose generally perpendicular to the plane in which it is set, to maintain said noose in open condition as it is projected, and to reduce the circumference of said noose to cause it to close in tightly about the part of the animal which operates said trigger mechanism,
   said actuating mechanism comprising a fixed tube adapted to be anchored in vertical position in the ground, a compression spring in the lower part of said fixed tube, a vertically movable member in said fixed tube above said spring and urged upwardly thereby and having cable guides at its upper ends, a pair of cables having their lower ends fixed within said tube and intermediate portions passing through said guides, the upper ends of said cables being fixed to generally opposed portions of said noose to reduce the circumference of said noose as said member is projected upwardly by said spring.
9. A trap as defined in claim 8 in which a generally opposed pair of said arms at their outer ends each have a pair of guides through which said noose extends, the upper ends of each of said cables being secured to said noose intermediate the guides of one of said pair of guides.
10. A trap as defined in claim 8 in which said vertically movable member is a second tube within said fixed tube and said trigger mechanism comprises a movable trigger device interconnecting the tops of said tubes, and a pull cap movable upwardly by the animal for whom the trap is set and until moved upwardly operable to retain said movable tube fixed in set position in said fixed tube.

11. A trap as defined in claim 10 which comprises a pivot connecting said trigger to said fixed tube having an abutment portion engageable with an upwardly facing surface on said movable tube when in set position.

12. A trap as defined in claim 8 in which the outer ends of said arms have guide openings through which said noose extends.

13. A trap as defined in claim 12 in which said trap includes a substantially air-impervious flexible sheet overlying said arms, and adapted to be moved thereby over the muzzle of an animal caught by said trap.

14. A trap as defined in claim 11 which comprises a keeper connected to said pivot and having a portion engaging said trigger to retain it in set position prior to placement of the pull cap in trigger retaining position and thereafter movable to a release position.

15. A trap as defined in claim 3 in which said trap includes a substantially air-impervious flexible sheet overlying said arms, and adapted to be moved thereby over the muzzle of an animal caught by said trap.

* * * * *